United States Patent
Shin et al.

(10) Patent No.: US 11,899,841 B2
(45) Date of Patent: Feb. 13, 2024

(54) HAPTIC ACTUATORS AND RELATED WEARABLE DEVICES

(71) Applicant: META PLATFORMS TECHNOLOGIES, LLC, Menlo Park, CA (US)

(72) Inventors: Dongsuk Shin, Seattle, WA (US); Benjamin Gorissen, Houthalen (BE); Daniele Piazza, Redmond, WA (US); David Rother Dobbs, Bothell, WA (US); Erik Samuel Roby, Seattle, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 130 days.

(21) Appl. No.: 17/705,962

(22) Filed: Mar. 28, 2022

(65) Prior Publication Data
US 2022/0357798 A1    Nov. 10, 2022

Related U.S. Application Data

(60) Provisional application No. 63/246,546, filed on Sep. 21, 2021, provisional application No. 63/186,741, filed on May 10, 2021.

(51) Int. Cl.
*H04B 3/36* (2006.01)
*G06F 3/01* (2006.01)

(52) U.S. Cl.
CPC ............ *G06F 3/016* (2013.01); *G06F 3/014* (2013.01)

(58) Field of Classification Search
CPC .......... G06F 3/016; G06F 3/014; G06F 3/044; H04B 3/36
See application file for complete search history.

(56) References Cited

U.S. PATENT DOCUMENTS

| | | | |
|---|---|---|---|
| 7,474,180 B2 * | 1/2009 | Bintoro | F16K 99/0015 335/78 |
| 2017/0168576 A1 * | 6/2017 | Keller | G06F 3/014 |
| 2019/0325716 A1 * | 10/2019 | Khoshkava | G08B 6/00 |
| 2020/0110465 A1 * | 4/2020 | Ma | G06F 3/014 |
| 2021/0052845 A1 * | 2/2021 | Chen | G08B 6/00 |

* cited by examiner

*Primary Examiner* — Toan N Pham
(74) *Attorney, Agent, or Firm* — Greenberg Traurig, LLP

(57) ABSTRACT

Haptic actuators may include a first active material coupled to a first side of an inactive substrate and a second active material coupled to a second side of the inactive substrate. The inactive substrate may be formed to initially exhibit a nonplanar shape when the first active material and the second active material are not actuated. Various other methods, systems, and devices are also disclosed.

20 Claims, 14 Drawing Sheets

HAPTIC ACTUATORS AND RELATED WEARABLE DEVICES

CROSS REFERENCE TO RELATED APPLICATIONS

This application claims the benefit of U.S. Provisional Patent Application No. 63/246,546, filed 21 Sep. 2021, and of U.S. Provisional Patent Application No. 63/186,741, filed 10 May 2021, the entire disclosure of each of which is incorporated herein by reference.

BRIEF DESCRIPTION OF DRAWINGS

The accompanying drawings illustrate a number of example embodiments and are a part of the specification. Together with the following description, these drawings demonstrate and explain various principles of the present disclosure.

Figure 1:
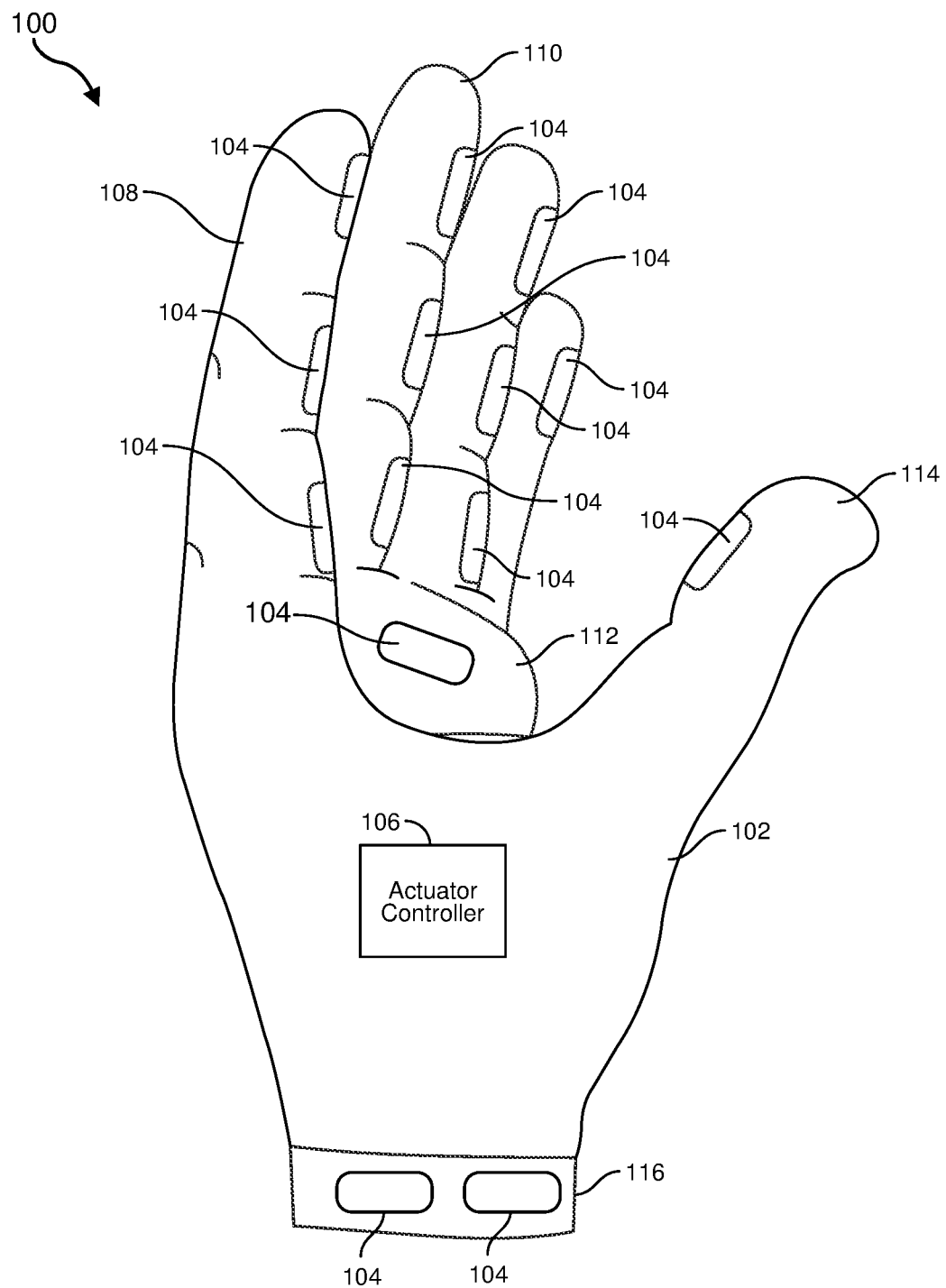
FIG. 1 is a perspective view of a wearable device in the form of a glove, according to at least one embodiment of the present disclosure.

Throughout the appendices, identical reference characters and descriptions indicate similar, but not necessarily identical, elements. While the example embodiments described herein are susceptible to various modifications and alternative forms, specific embodiments have been shown by way of example in the appendices and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Haptic devices include devices that may provide signals (e.g., feedback, indications, etc.) through tactile sensations, such as via vibration, pressure, or force application, temperature changes, etc. Vibrotactile haptic devices vibrate to provide haptic feedback to a user of a device. For example, some modern mobile devices (e.g., cell phones, tablets, mobile gaming devices, gaming controllers, etc.) may include a vibrotactile haptic device that informs the user through a vibration that an action has been taken. The vibration may indicate to the user that a selection has been made or a touch event has been sensed. Vibration may also deliver physical information to the user, such as conveying physical object properties like hardness or texture, indicating a location of an object, etc. Abstract information, such as communication, navigation, quantities, speed, etc., may also be delivered to the user by various vibrational signals. Vibrotactile devices may also be used to provide an alert or signal to the user.

Various types of haptic devices exist, such as piezoelectric devices, eccentric rotating mass devices, and linear resonant actuators. Such haptic devices may include one or more elements that vibrate or apply a force upon application of an electrical voltage. In the case of piezoelectric devices, an applied voltage may induce bending or other displacement in a piezoelectric material. Eccentric rotating mass devices may induce vibration by rotating an off-center mass around an axle of an electromagnetic motor. Linear resonant actuators may include a mass on an end of a spring that can be driven back and forth by a linear actuator to cause vibration. Many of these haptic devices are rigid and inflexible. Moreover, haptic devices typically may be configured to induce a certain, constant sensation to the user upon application of a consistent voltage thereto.

The present disclosure is generally directed to various configurations and geometries for flexible haptic actuators that may be used in haptics applications. In general, the configurations may include an active layer (e.g., an electroactive polymer layer, a pneumatic layer, etc.) and a passive layer (e.g., a patterned substrate, an electrode, a structure with a topology, etc.). Several examples that relate to haptic actuators may be implemented alone or in a variety of combinations: (1) an active material (e.g., an electroactive material) can be incorporated into a preformed geometry, such as a thimble-like structure on fingertips of a haptic glove; (2) the active material can be glued onto a bistable structure for displacement and/or force amplification; (3) pneumatic actuation and electroactive actuation can be combined; (4) the active material can be divided into multiple distinct sections (left-right asymmetry, concentric circles, individually addressable patches or strips, etc.) for different actuation options; (5) an inactive substrate material can be pre-formed to have a non-flat initial shape, such as domed, or non-symmetrical; (6) the inactive substrate material can have one or more holes or cutouts; (7) the substrate can have circular or non-circular geometries, such as polygonal, rectangular, split, etc.; (8) a large area can have an array of active materials that are individually addressable; and/or (9) the active material can be pre-formed to have a non-flat (e.g., curved) initial shape. These example geometries and configurations can provide options for inducing a variety of haptic signals of different strengths, displacements, waveforms, patterns, etc.

FIG. 1 is a perspective view of a wearable device 100 in the form of a glove, according to at least one embodiment of the present disclosure. The wearable device 100 may include a body 102 that physically supports one or more haptic actuators 104. Operation of the haptic actuators 104 may be controlled by an actuator controller 106, which may also be supported by the body 102 or may be supported by a separate wearable device (e.g., an armband, a vest, a head-mounted display, etc.). The actuator controller 106 may be configured to actuate the haptic actuators 104 based on input from a separate device, such as a head-mounted display system, a gaming system, or another system configured to present visual and/or audible content to the user. In some cases, actuation of the haptic actuators 104 may correspond to the visual and/or audible content displayed to the user. The actuation of the haptic actuators 104 may be accomplished by application of a voltage to the haptic actuators 104. The applied voltage may have a variety of forms to induce different haptic sensations, such as constant at various intensities, pulsed in a rising and falling wave, pulsed in an on/off configuration, etc.

The haptic actuators 104 may be positioned on the body 102 of the wearable device 100 in a location to transmit a haptic sensation to a user's skin when the body 102 is worn by the user. In some examples, the haptic actuators 104 may be positioned on or adjacent to an interior (e.g., skin-facing surface) of the wearable device 100. The haptic sensation may be transmitted directly by the haptic actuators 104 abutting against the user's skin. In additional examples, a textile (e.g., clothing, fabric, leather, polymer sheet, etc.) or other material (e.g., a rigid plate, an inflatable bladder, etc.) may be disposed between the haptic actuators 104 and the user's skin. In the example shown in FIG. 1, the haptic actuators 104 may be positioned at a variety of locations on the body 102 of the wearable device 100, such as along one or more glove fingers 108 (e.g., at a fingertip portion 110 of the glove fingers 108 and/or at an intermediate portion of the glove fingers 108), in a palm region 112, in a thumb portion 114, on a cuff 116, etc.

As explained in further detail below, each of the haptic actuators 104 may include at least one active material (e.g., an electroactive material) coupled to a substrate. The actuator controller 106 may be operatively coupled to the haptic actuators 104 to control the operation (e.g., vibration, force application) of the active material. The active material and/or the substrate may be physically configured in a variety of ways, such as in one or more of the configurations described below with reference to FIGS. 3-9.

Figure 2:
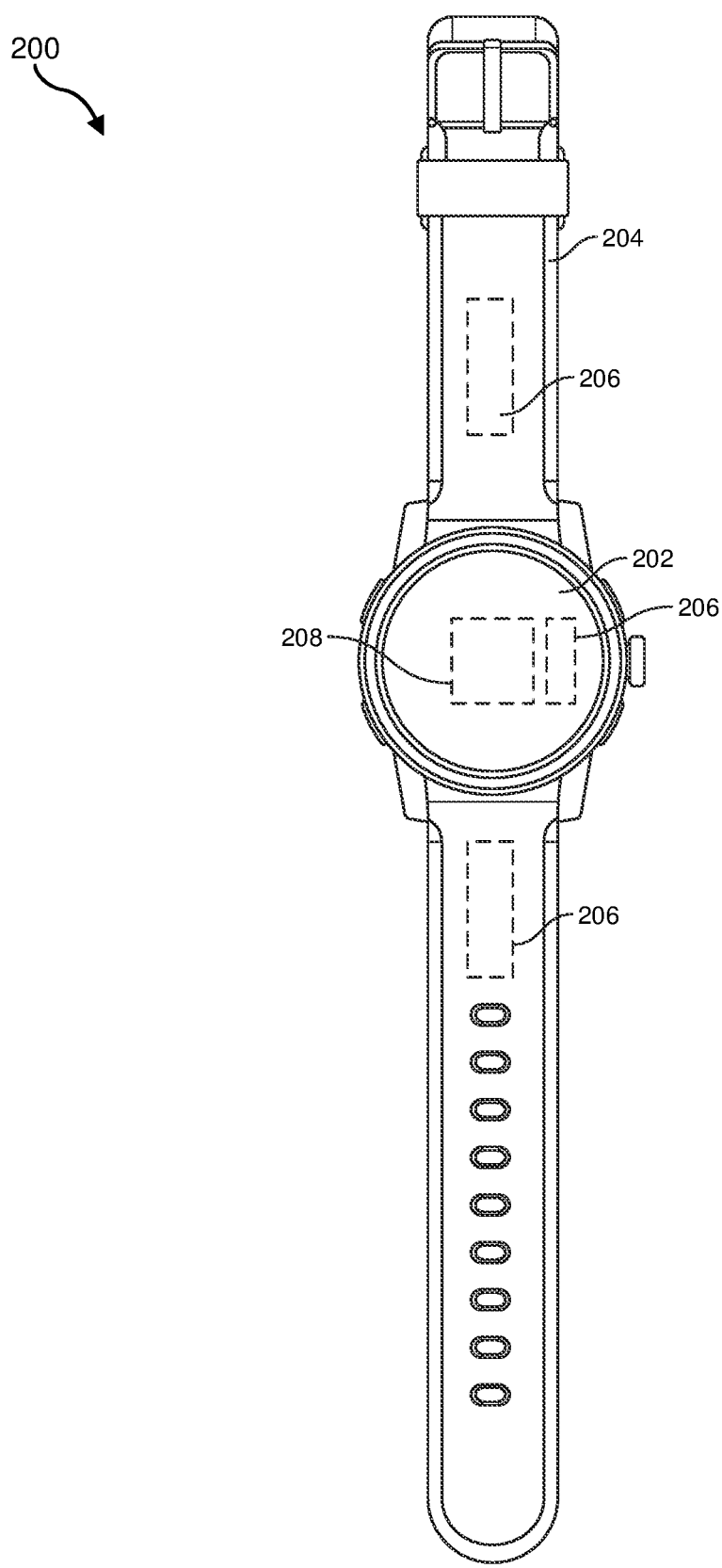
FIG. 2 is a perspective view of a wearable device in the form of a wristwatch, according to at least one embodiment of the present disclosure.

The wearable device 100 incorporating such haptic actuators 104 may have a form factor other than the glove illustrated in FIG. 1, such as a wristwatch (e.g., a watch band and/or a watch body of a wristwatch), wristband, armband, headband, leg band, etc. For example, FIG. 2 is a perspective view of a wearable device 200 in the form of a wristwatch, according to at least one embodiment of the present disclosure.

The wearable device 200 may include a watch body 202 coupled to a watch band 204. The watch body 202 and the watch band 204 may have a size and/or shape that is configured to allow a user to wear the wearable device 200 on a body part (e.g., a wrist). The watch body 202 and/or the watch band 204 may support one or more haptic actuators 206. Operation of the haptic actuators 206 may be controlled by an actuator controller 208, which may be supported by the watch body 202 (as shown in FIG. 2) or by the watch band 204. The haptic actuators 206 of the wearable device 200 may each include a haptic actuator coupled to a substrate, as explained in further detail with reference to FIGS. 3-9.

Figure 3:
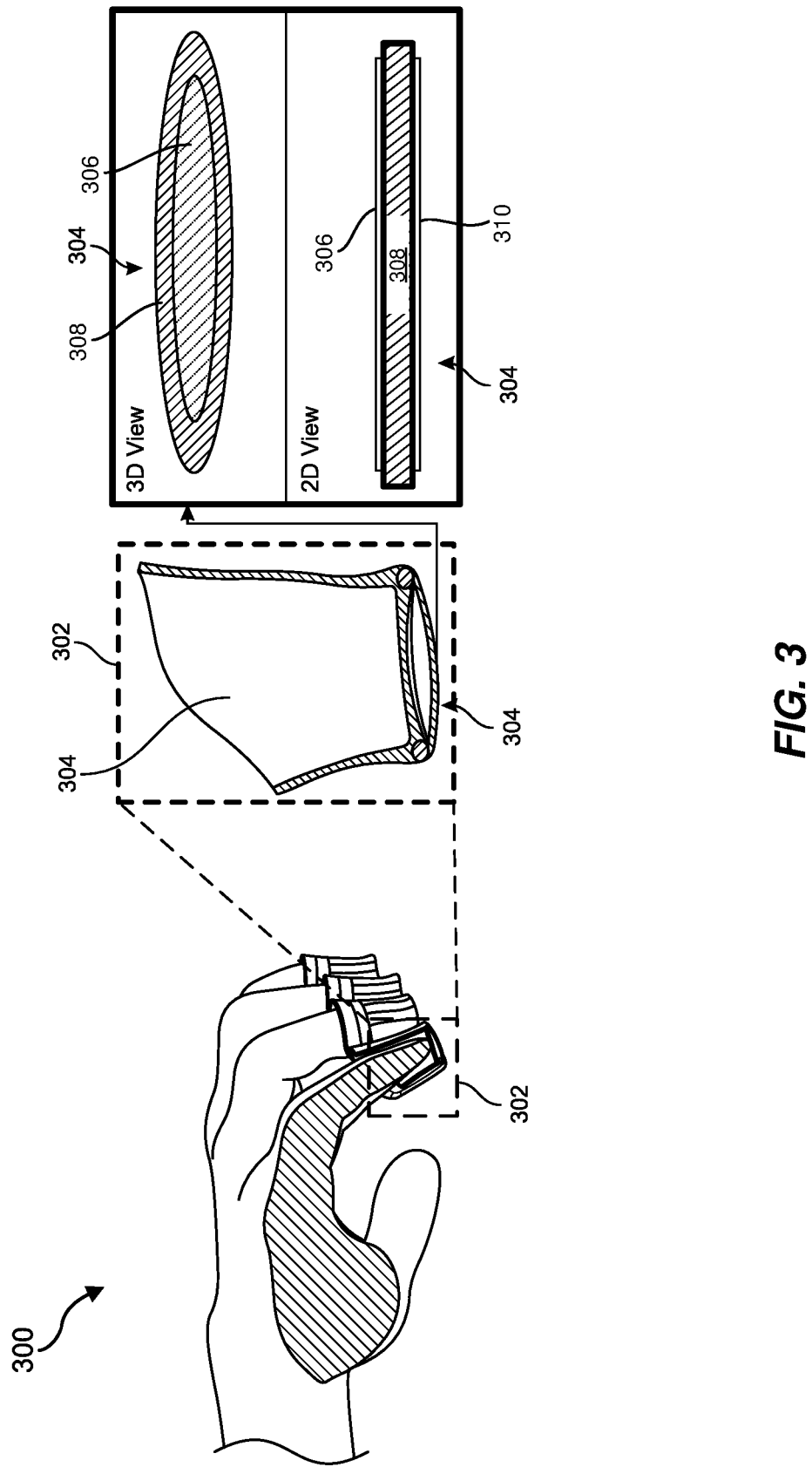
FIG. 3 includes a side perspective view of a glove, a detailed cross-sectional view of a fingertip portion of the glove, a detailed perspective view of a haptic actuator of the glove, and a side view of the haptic actuator of the glove, according to at least one embodiment of the present disclosure.

FIG. 3 includes a side perspective view of a wearable device in the form of a glove 300, a detailed cross-sectional view of a fingertip portion 302 of the glove 300, a detailed perspective view of a haptic actuator 304 of the glove 300, and a side view of the haptic actuator 304, according to at least one embodiment of the present disclosure.

The glove 300 may include a body that is shaped and sized to be worn by a user. The glove 300 may include a haptic actuator 304, which may include a structure that is attached to a glove that includes an active material (e.g., an electroactive material) configured to be actuated to provide haptic feedback to the user. By way of example and not limitation, one or more fingertip portions 302 may provide haptic feedback (e.g., vibrotactile feedback) to the user's corresponding fingertip. In some embodiments, the fingertip portion 302 may include a rigid shell sized and shaped to be worn on the user's fingertip. The rigid shell may be similar to a thimble, which may support the haptic actuator 304.

The haptic actuator 304 may, in some embodiments, be substantially circular for positioning over the user's fingertip. The haptic actuator 304 may include a first active material 306 coupled to a first side of an inactive substrate 308 and a second active material 310 coupled to a second, opposite side of the inactive substrate 308. The first active material 306 and second active material 310 may be any material capable of deforming (e.g., vibrating, bending, etc.) upon actuation, such as an electroactive material, a thermally actuated material, and/or a magnetically actuated material. For example, the active material may be or include at least one of: an electroactive polymer (e.g., polyvinylidene fluoride), a dielectric elastomer material, a microfiber composite material, a shape memory alloy, etc.

The inactive substrate 308 may be or include a material that is not, by itself, electrically actuatable to alter a shape or position thereof. For example, the inactive substrate 308 may be or include an electrically insulative material, such as an electrically insulative polymer material. The inactive substrate may be flexible to allow for vibration or other movement of the active materials 306, 310 upon actuation of the active materials 306, 310.

Although FIG. 3 illustrates a glove 300, the present disclosure is not so limited. For example, the fingertip portion 302 with the haptic actuator 304 may be a standalone wearable device, without other typical components of a full glove.

As noted above, the active materials of the haptic actuator 304 may be configured to provide haptic feedback to the user in the form of vibrotactile feedback and/or force feedback. In additional embodiments, the haptic actuator 304 may also exhibit force-sensing capabilities. Thus, when a user presses the haptic actuator 304 against a physical object or surface, a voltage may be induced due to deformation of the haptic actuator 304. The glove 300 may include one or more force-sensing components configured to use the induced voltage to determine the force with which the user presses the haptic actuator 304 against the physical object or surface.

Figure 4:
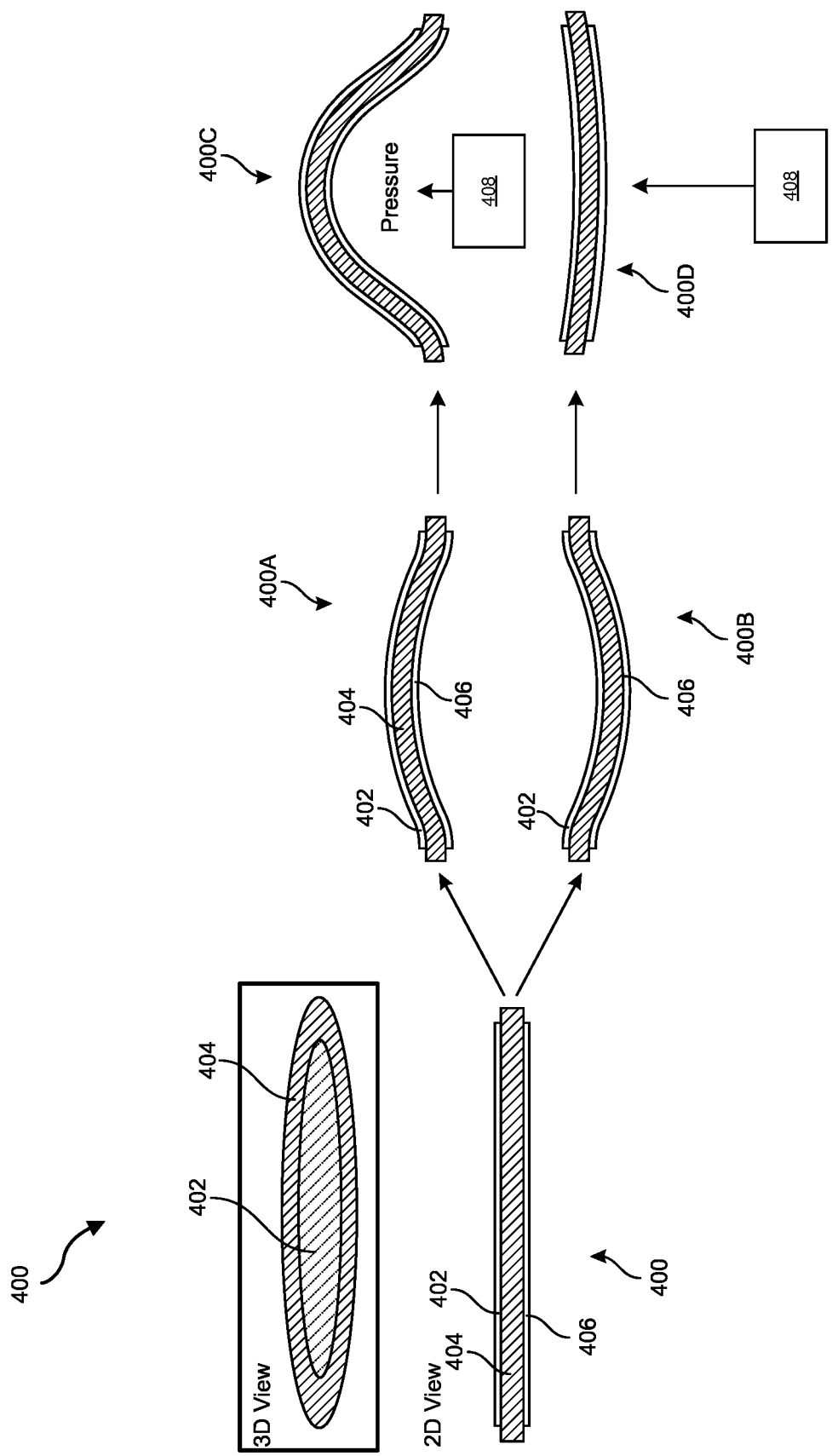
FIG. 4 includes a side perspective view of a haptic actuator, a side view of the haptic actuator, two side views of the haptic actuator in respective upward and downward actuation states, and two side views of the haptic actuator in respective upward and downward actuation states in the presence of pneumatic pressure, according to at least one embodiment of the present disclosure.

FIG. 4 includes a side perspective view of a haptic actuator 400, a side view of the haptic actuator 400, two side views of the haptic actuator 400 in respective upward and downward actuation states, and two side views of the haptic actuator 400 in respective upward and downward actuation states in the presence of pneumatic pressure, according to at least one embodiment of the present disclosure.

The haptic actuator 400 may include a first active material 402 coupled to a first side of a substrate 404 and a second active material 406 coupled to a second, opposite side of the substrate 404.

Upon application of a sufficient voltage to the active materials 402, 406, the haptic actuator 400 may be deformed into a first deformed state (e.g., an upward deformed state), as shown at reference numeral 400A in FIG. 4. Upon application of a sufficient opposite voltage to the active materials 402, 406, the haptic actuator 400 may be deformed into a second deformed state (e.g., a downward deformed state), as shown at reference numeral 400B in FIG. 4. Upon applications of equal and opposite voltages, the first and second deformed states 400A, 400B may be substantially symmetrical to each other. For example, the first deformed state 400A may have an upward shape that is substantially similar and opposite to the downward shape of the second deformed state 400B.

In some embodiments, a pressure source 408 may be positioned and configured to selectively (e.g., on-demand) apply a fluid pressure to at least one of the first side or the second side of the substrate 404. For example, the pressure source 408 may be configured to selectively apply the fluid pressure to only one of the first side or the second side of the substrate 404, such as to only the second side as illustrated in FIG. 4. The haptic actuator 400 is illustrated in a third deformed state 400C when the active materials 402, 406 are actuated in an upward direction (e.g., as in the first deformed state 400A) and a pressure is applied to the second side of the substrate 404 by the pressure source 408. The haptic actuator 400 is illustrated in a fourth deformed state 400D when the active materials 402, 406 are actuated in a downward direction (e.g., as in the second deformed state 400B) and the same pressure is applied to the second side of the substrate 404 by the pressure source 408.

The pressure source 408 may apply a pressure to the substrate 404 to alter mechanical properties of the haptic actuator 400. In some examples, the pressure source 408 may apply a sufficient pressure to enable bistable actuation of the haptic actuator 400. The level of pressure applied to achieve bistable actuation may depend on several factors, such as the geometry (e.g., thickness, width, length, diameter, shape, dome height, etc.) of the substrate 404 and active materials 402, 406, the material types and mechanical properties (e.g., stiffness, hardness, elasticity, etc.) of the substrate 404 and active materials 402, 406, temperature of the haptic actuator 400 during pressure application, and boundary conditions of the haptic actuator 400 (e.g., how the active materials 402, 406 are coupled to the substrate 404, how the haptic actuator 400 is attached or otherwise secured to a supporting structure, etc.).

As shown in FIG. 4, when the pressure is applied by the pressure source 408, the resulting upward and downward shapes may not be symmetrical. For example, the haptic actuator 400 may deform upward to a greater extent in the third deformed state 400C due to the combination of the upward fluid pressure and the upward deformation from actuation of the first and second active materials 402, 406. The haptic actuator 400 may deform upward (or, in some embodiments, downward) to a lesser extent in the fourth deformed state 400D due to the combination of the upward fluid pressure and the downward deformation from actuation of the first and second active materials 402, 406. Thus, the pressure source 408 may be used to induce a different actuation response in the haptic actuator 400, which may in turn cause the user to experience a different (e.g., stronger, weaker, etc.) haptic sensation.

In one example, displacement of the haptic actuator 400 may be amplified by configuring and operating the haptic actuator 400 in a bistable manner. In this case, the haptic actuator may flip between two deformed states (e.g., between the third deformed state 400C and the fourth deformed state 400D) in response to electrical actuation of the active materials 402, 406 and/or pressure application (e.g., pneumatic preloading) by the pressure source 408. Bistable actuation may achieve displacements that are more efficient than electrical or pressure actuation alone. In addition, the haptic actuator 400 may be configured (e.g., by tailoring the geometric, material, and boundary condition properties) to operate in a desired bistable manner, such as for simulating a button click or keystroke when the haptic actuator 400 flips between different deformed states.

In another example, the pressure source 408 may induce static preloading or grounding forces to ensure skin contact, which may enhance performance of the first and second active materials 402, 406. For example, activating the first and second active materials 402, 406 across a frequency range (e.g., from constant current (DC current) to 1000 Hz) when the pressure source 408 is activated may improve vibrotactile performances. In additional examples, depending on dynamic actuation schemes, different mode shapes of entire structures can be activated as well. Moreover, producing frequency- and/or amplitude-modulated haptic signals may be feasible by controlling actuation of the pressure source 408 and of the first and second active materials 402, 406. In yet further examples, preloading the haptic actuator 400 with the pressure source 408 may improve electrical efficiency of the haptic actuator 400 by reducing activation power (e.g., voltage) used to actuate the haptic actuator 400 with the active materials 402, 406.

In additional examples, the first and second active materials 402, 406 may be actuated and held in one deformed state (e.g., upward or downward), rather than vibrated between two opposing deformed states. In this case, actuation of the first and second active materials 402, 406 may control whether, or to what extent, the actuator 400 inflates from the pressure source 408. Thus, a constant fluid pressure may be applied to the actuator 400 from the pressure source 408, but inflation may be controlled by actuation of the first and second active materials 402, 406.

In additional embodiments, the pressure source 408 may be operated at a variety of pressures to result in corresponding different deformed shapes of the haptic actuator 400.

Figure 5A:
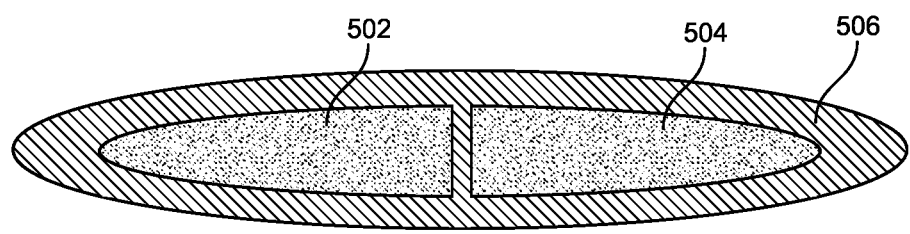
FIG. 5A is a perspective view of a haptic actuator including two distinct active materials adjacent to each other, according to at least one embodiment of the present disclosure.
Figure 5B:
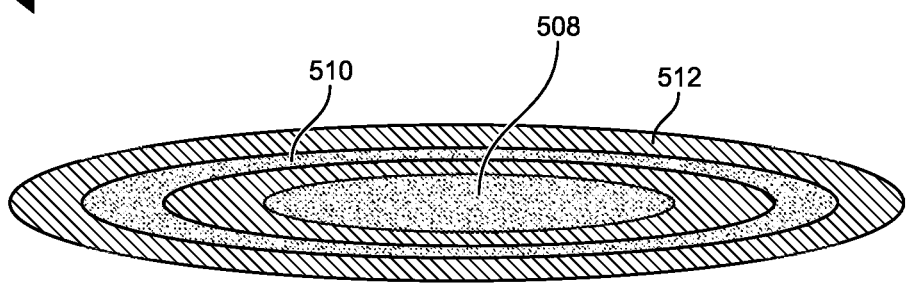
FIG. 5B is a perspective view of a haptic actuator including two distinct active materials arranged concentrically, according to at least one embodiment of the present disclosure.

FIG. 5A is a perspective view of a haptic actuator 500A including two distinct active materials 502, 504 adjacent to each other on a substrate 506, according to at least one embodiment of the present disclosure. FIG. 5B is a perspective view of a haptic actuator 500B including two distinct active materials 508, 510 arranged concentrically on a substrate 512, according to at least one embodiment of the present disclosure.

The first active material 502 and the second active material of the haptic actuator 500A may each have a semicircle shape, as shown in FIG. 5A. However, other shapes are also included in the present disclosure, such as trapezoidal, rectangular, circular, etc. The active materials 502, 504 may be individually and independently actuatable. Thus, the haptic actuator 500A may be operated to actuate the first active material 502 while the second active material 504 is not actuated, to actuate the second active material 504 while the first active material 502 is not actuated, and/or to simultaneously actuate both of the first and second active materials 502, 504. Sequentially actuating the active materials 502, 504 may induce a haptic sensation of something moving along (e.g., dragging along, rolling along, etc.) the body part (e.g., finger) of the user. Actuating only one of the active materials 502, 504 may provide a directional signal to the user and/or may provide a weaker signal compared to simultaneously actuating both of the active materials 502, 504.

The concentric active materials 508, 510 of the haptic actuator 500B of FIG. 5B may include an inner first active material 508 and an outer second active material 510. The first and second active materials 508, 510 may be individually and independently actuatable. Thus, the haptic actuator 500B may be operated to actuate the first active material 508 while the second active material 510 is not actuated, to actuate the second active material 510 while the first active material 508 is not actuated, and/or to simultaneously actuate both of the first and second active materials 508, 510. Sequentially actuating the active materials 508, 510 may induce a pinching or spreading haptic sensation to the user. Actuating only one of the active materials 508, 504 may provide a weaker signal compared to simultaneously actuating both of the active materials 502, 504.

The distinct active materials 502, 504, 508, 510 of FIGS. 5A and 5B are illustrated on one side (e.g., the top side) of the respective substrates 506, 512. However, the present disclosure is not so limited. Active materials on an opposing side of the substrate(s) 506, 512 may also include multiple distinct sections of active materials. In additional embodiments, the active materials on the opposing side of the substrate(s) 506, 512 may be one single, unitary active material.

Figure 6A:
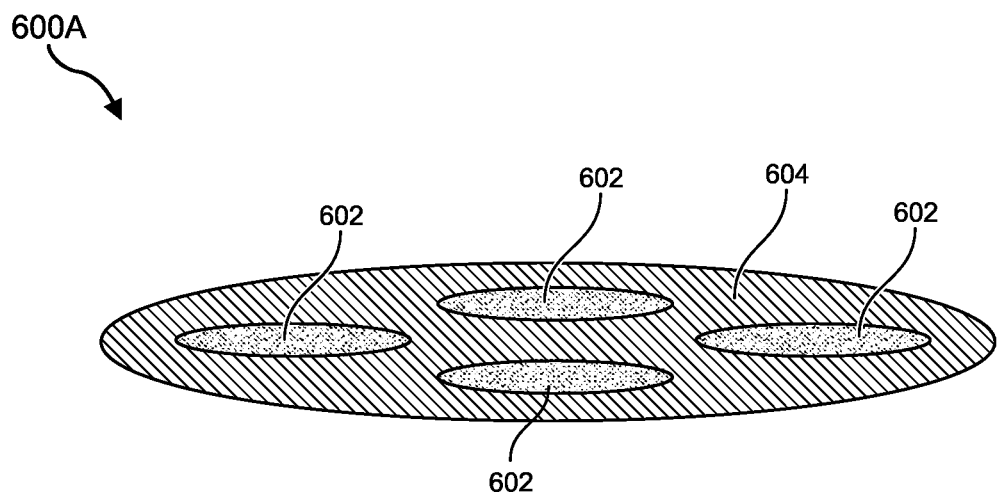
FIG. 6A is a perspective view of a haptic actuator including four distinct active materials adjacent to each other, according to at least one embodiment of the present disclosure.
Figure 6B:
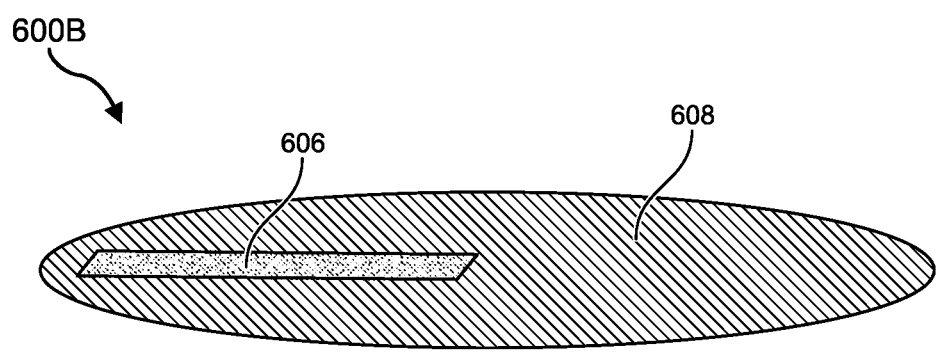
FIG. 6B is a perspective view of a haptic actuator including an individual rectangular active material, according to at least one embodiment of the present disclosure.

FIG. 6A is a perspective view of a haptic actuator 600A including four distinct active materials 602 adjacent to each other on a substrate 604, according to at least one embodiment of the present disclosure. FIG. 6B is a perspective view of a haptic actuator 600B including an individual rectangular active material 606 on a circular substrate 608, according to at least one embodiment of the present disclosure.

The haptic actuator 600A illustrated in FIG. 6A includes four active materials 602 separated from each other by relatively larger spaces compared to the embodiments illustrated in FIGS. 5A and 5B. The four active materials 602 may be individually and independently actuatable. The greater quantity of active materials 602 may provide additional actuation options and/or additional haptic sensations that may be induced. The more distant separation of the active materials 602 may help the user to sense a difference when one or more of the active materials 602 is/are actuated while another one or more of the active materials 602 is/are not actuated. In addition, multiple different intensities of haptic sensations may be induced by actuating one, two, three, or four of the active materials 602.

The haptic actuator 600B of FIG. 6B includes a rectangular active material 606 on a circular substrate 608. The rectangular active material 606 may provide additional and different options for actuation and for inducing different haptic sensations. Thus, active materials according to the present disclosure may have a variety of different shapes, spacings, quantities, etc., which may enable a variety of different configurations and haptic sensation results.

Figure 7A:
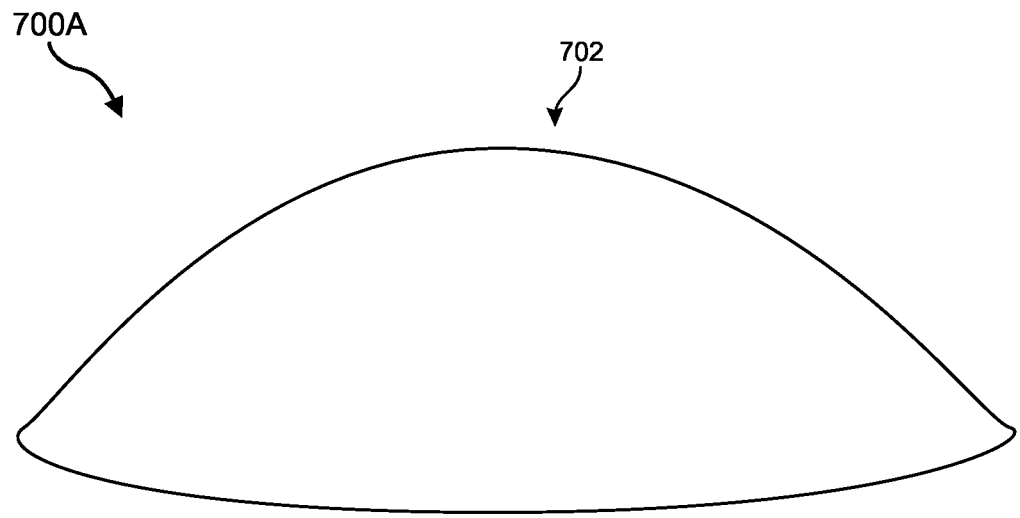
FIG. 7A is a perspective view of a symmetrical nonplanar substrate for a haptic actuator, according to at least one embodiment of the present disclosure.
Figure 7B:
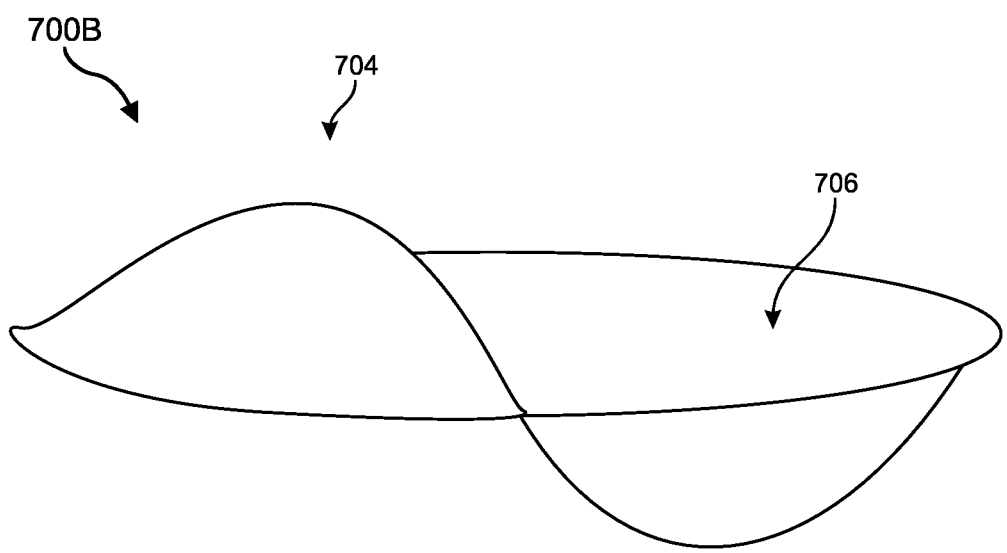
FIG. 7B is a perspective view of a nonsymmetrical nonplanar substrate for a haptic actuator, according to at least one embodiment of the present disclosure.

FIG. 7A is a perspective view of a symmetrical nonplanar substrate 700A for a haptic actuator, according to at least one embodiment of the present disclosure. FIG. 7B is a perspective view of a nonsymmetrical nonplanar substrate 700B for a haptic actuator, according to at least one embodiment of the present disclosure. To better view the substrates 700A, 700B, corresponding active materials are not shown in FIGS. 7A and 7B. However, it is to be understood that one or more active materials (e.g., any of the active materials described above with reference to FIGS. 3-6B) may be coupled to the substrates 700A, 700B.

As illustrated in FIGS. 7A and 7B, substrates of haptic actuators according to the present disclosure may, in some embodiments, be formed to initially (e.g., when a corresponding active material is not actuated) exhibit a nonplanar shape. For example, the symmetrical nonplanar substrate 700A of FIG. 7A may have a domed shape 702 with circular symmetry. The domed shape 702 of the symmetrical nonplanar substrate 700A may be useful for a variety of reasons, such as to fit around or along a user's body part (e.g., fingertip), to bring the active material (and therefore haptic sensation) closer to the user's body part, and/or to provide different haptic sensations compared to a haptic actuator including an initially planar substrate.

The nonsymmetrical nonplanar substrate 700B of FIG. 7B may have a nonplanar shape that is not symmetrical. By way of example and not limitation, the nonsymmetrical nonplanar substrate 700B may include an upward protrusion 704 and a downward protrusion 706 when a corresponding active material is not actuated. Actuation of the active material on the nonsymmetrical nonplanar substrate 700B may result in a different haptic signal compared to a planar substrate. For example, the haptic signal resulting from the nonsymmetrical nonplanar substrate 700B may include a rolling sensation. In additional embodiments, the asymmetry may have a different shape than that shown in FIG. 7B to result in additional haptic sensations.

In some examples, the symmetrical nonplanar substrate 700A and/or the nonsymmetrical nonplanar substrate 700B may act as a bistable mechanism for augmenting actuation of a corresponding active material. For example, actuation of the active material may alternate a state of the nonplanar substrate 700A, 700B between a first stable state (e.g., upward) and a second stable state (e.g., downward). The geometry and material properties of the nonplanar substrate(s) 700A, 700B may augment a force and/or displacement distance of the corresponding active material, such that the force and/or displacement increases in the first and/or second stable states compared to a similar haptic actuator that employs a planar substrate.

In some embodiments of the present disclosure, active materials may be formed to initially have a nonplanar shape. Such nonplanar active materials may be coupled to (e.g., adhered to, bonded to, etc.) initially nonplanar inactive substrates (e.g., nonplanar substrates 700A, 700B) or to initially planar inactive substrates (e.g., inactive substrates 404, 506, 512, 604, 608). Initially nonplanar active materials may exhibit different actuation modes compared to initially planar active materials.

Figure 8A:
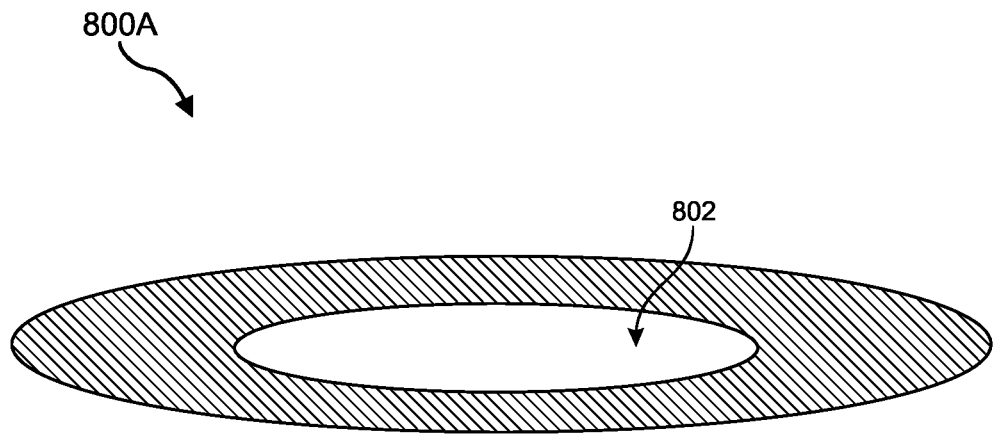
FIG. 8A is a perspective view of a discontinuous substrate for a haptic actuator, according to at least one embodiment of the present disclosure.
Figure 8B:
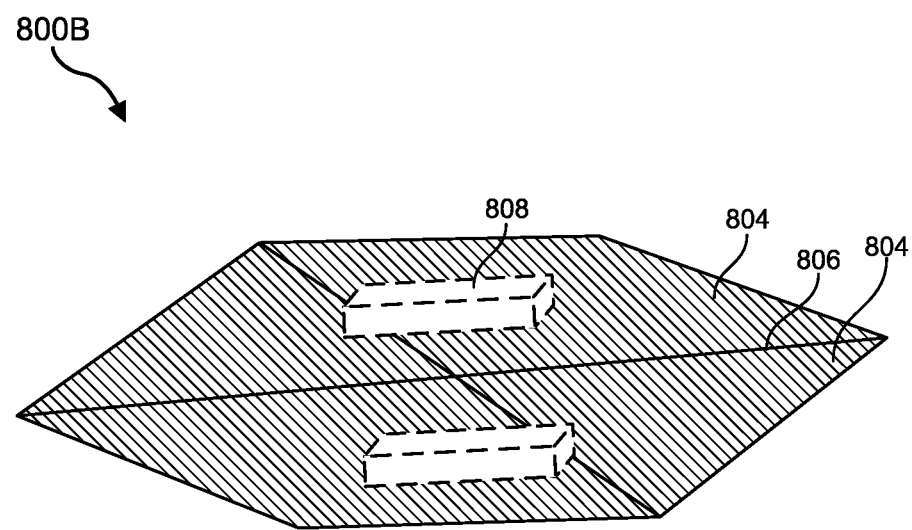
FIG. 8B is a perspective view of another substrate for a haptic actuator, according to at least one embodiment of the present disclosure.

FIG. 8A is a perspective view of a discontinuous substrate 800A for a haptic actuator, according to at least one embodiment of the present disclosure. FIG. 8B is a perspective view of another substrate 800B for a haptic actuator, according to at least one embodiment of the present disclosure. To better view the substrates 800A, 800B, corresponding active materials are not shown in FIGS. 8A and 8B. However, it is to be understood that one or more active materials may be coupled to the substrates 800A, 800B.

As shown in FIG. 8A, the substrate 800A may include one or more holes 802. The hole(s) 802 may alter a deformation of the substrate 800A upon actuation of a corresponding active material. In addition, in some embodiments, another haptic actuator may be positioned in or under the hole(s) 802 and may be actuatable through the hole(s) 802.

As shown in FIG. 8B, the substrate 800B may include multiple sections 804 separated by one or more slits 806. In some examples, a single, continuous active material may be positioned over the multiple sections 804 of the substrate 800B. The slits 806 may at least partially decouple the multiple sections 804 from each other, which may result in a more flexible substrate 800B for increasing a displacement of the haptic actuator upon actuation of the active material. In additional examples, each of the sections 804 of the substrate 800B may support a distinct active material.

Optionally, haptic actuators of the present disclosure (whether they be continuous or discontinuous) may include one or more structural supports 808, which may be coupled to a corresponding active material and/or to the substrate 800B itself. The structural supports 808 may be present for a variety of reasons. For example, the structural supports 808 may provide pressure points for strengthening a haptic sensation induced by a haptic actuator. The structural supports 808 may alter a resonant frequency or other operating characteristic of the haptic actuator. The structural supports 808 may provide a standoff for the haptic actuator to facilitate proper positioning of the haptic actuator in or on a wearable device, and/or to provide a space through which the haptic actuator may move when actuated.

FIG. 8B also illustrates that substrates of haptic actuators of the present disclosure (whether they be continuous or discontinuous) need not have a circular outer shape. For example, the substrate 800B has a polygonal (e.g., hexagonal) shape. Additional suitable shapes for haptic actuator substrates may include rectangular, square, spiral, trapezoidal, conical, frustoconical, pyramid, irregular, heptagonal, octagonal, oval, etc.

Figure 9:
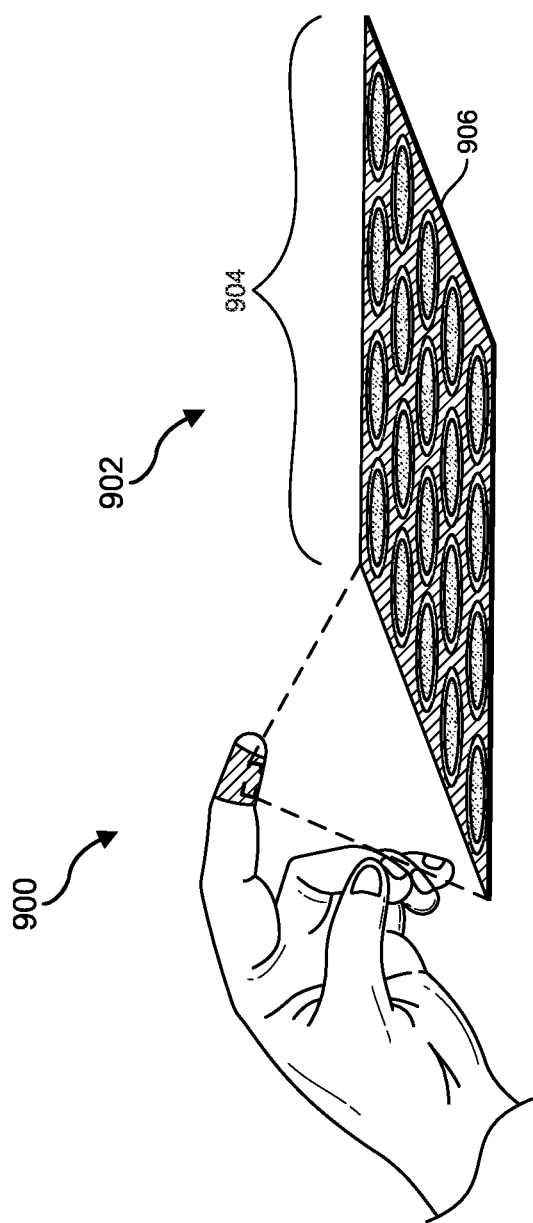
FIG. 9 is a perspective view of a wearable device incorporating a haptic actuator and a detailed perspective view of the haptic actuator including an array of active materials that are individually actuatable, according to at least one embodiment of the present disclosure.

FIG. 9 includes a perspective view of a wearable device 900 incorporating a haptic actuator 902 and a detailed perspective view of the haptic actuator 902 including an array 904 of active materials that are individually actuatable on an inactive substrate 906, according to at least one embodiment of the present disclosure.

The wearable device 900 shown in FIG. 9 is illustrated as a ring or finger band. However, the present disclosure is not so limited. For example, the wearable device 900 may be or include a glove, an armband, a wristband, a wristwatch, a vest, a headband, etc. The array 904 of active materials may include a plurality of distinct active materials that are individually and independently actuatable. By way of example and not limitation, the array 904 may include a square of four, nine, sixteen, twenty-five, thirty-six, or more distinct active materials. In additional embodiments, the array 904 may not be square. For example, the array 904 may be elongated, with six (e.g., two-by-three), eight (two-by-four), twelve (e.g., two-by-six or three-by-four), or another number of distinct active materials. In yet additional examples, the array 904 may have a circular shape, polygonal shape, or other shape.

The active materials of the array 904 may be actuated in a variety of different patterns. For example, a single active material may be actuated at a time. Different single active materials may be actuated in sequence to provide a haptic sensation of movement along the body part (e.g., finger) of the user. In additional examples, rows and/or columns of active materials may be actuated at a same time. Different rows and/or columns of active materials may be actuated in sequence to provide a different haptic sensation of movement along the user's body part. In additional embodiments, a reduced number (e.g., half) of the active materials of the array 904 may be actuated to provide a weak haptic signal and a greater number (e.g., all) of the active materials of the array 904 may be actuated to provide a strong haptic signal. Some of the active materials may also be actuated in a particular shape (e.g., rectangular, triangular, circular, etc.) to provide a sensation of touching an object having the particular shape. Additional actuation patterns may also be used for a variety of different haptic signals and/or applications, such as to induce a sensation of touching a fine texture, a rough texture, etc.

Accordingly, the present disclosure includes many different geometries and configurations of haptic actuators, which may be employed singly or in any functional combination. The haptic actuators may be implemented in a wearable device, such as a haptic wearable device for an artificial-reality system (e.g., any of the artificial-reality systems described below with reference to FIGS. 10-14).

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
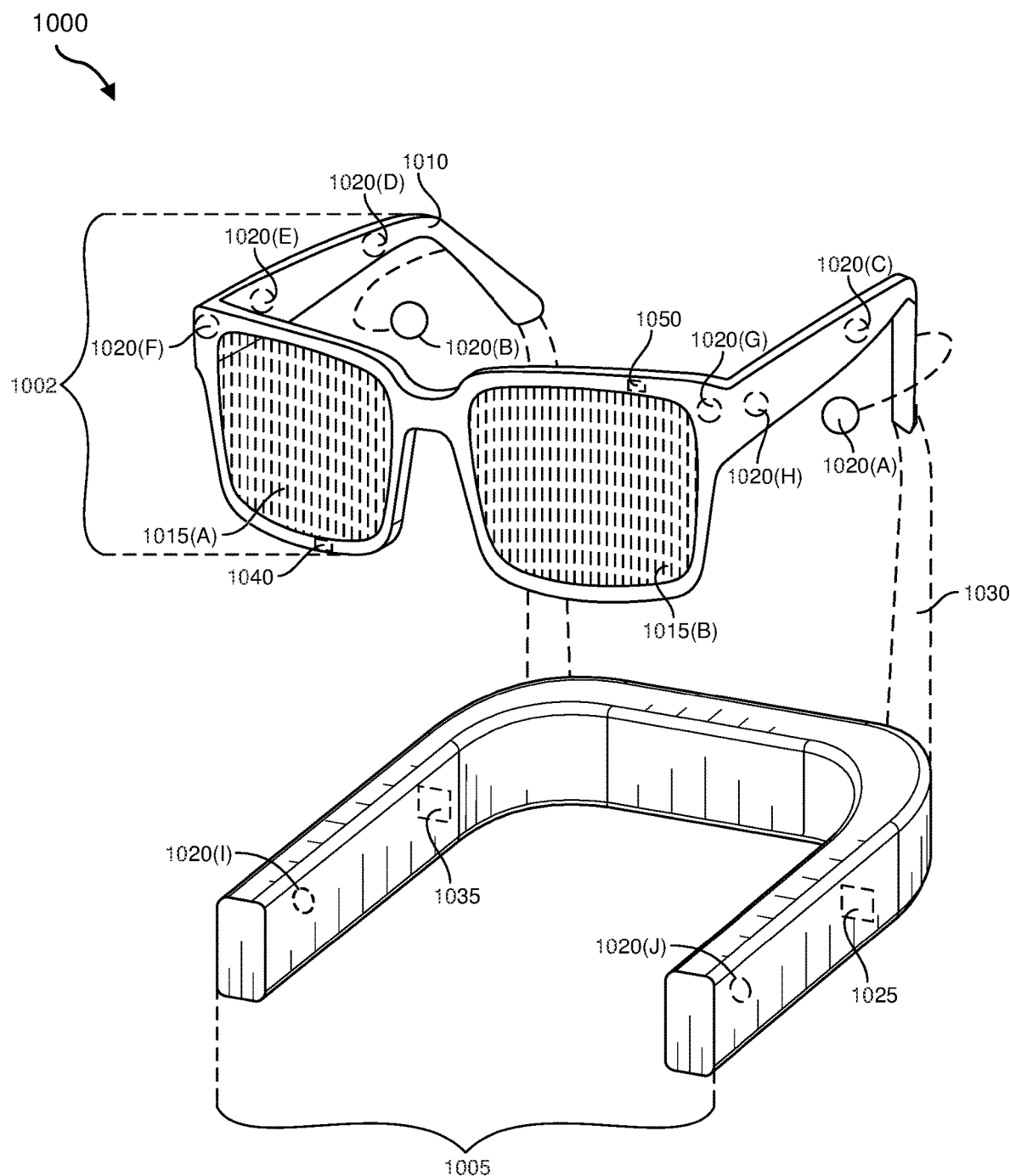
FIG. 10 is an illustration of exemplary augmented-reality glasses that may be used in connection with embodiments of this disclosure.

Turning to FIG. 10, the augmented-reality system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the augmented-reality system 1000 includes two displays, embodiments of this disclosure may be implemented in augmented-reality systems with a single NED or more than two NEDs.

In some embodiments, the augmented-reality system 1000 may include one or more sensors, such as sensor 1040. The sensor 1040 may generate measurement signals in response to motion of the augmented-reality system 1000 and may be located on substantially any portion of the frame 1010. The sensor 1040 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1000 may or may not include the sensor 1040 or may include more than one sensor. In embodiments in which the sensor 1040 includes an IMU, the IMU may generate calibration data based on measurement signals from the sensor 1040. Examples of the sensor 1040 may include, without limitation, accelerometers, gyroscopes, magnetometers, other suitable types of sensors that detect motion, sensors used for error correction of the IMU, or some combination thereof.

In some examples, the augmented-reality system 1000 may also include a microphone array with a plurality of acoustic transducers 1020(A)-1020(J), referred to collectively as acoustic transducers 1020. The acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on the frame 1010, and/or acoustic transducers 1020(I) and 1020(J), which may be positioned on a corresponding neckband 1005.

In some embodiments, one or more of the acoustic transducers 1020(A)-(J) may be used as output transducers (e.g., speakers). For example, the acoustic transducers 1020(A) and/or 1020(B) may be earbuds or any other suitable type of headphone or speaker.

The configuration of the acoustic transducers 1020 of the microphone array may vary. While the augmented-reality system 1000 is shown in FIG. 10 as having ten acoustic transducers 1020, the number of acoustic transducers 1020 may be greater or less than ten. In some embodiments, using higher numbers of the acoustic transducers 1020 may increase the amount of audio information collected and/or the sensitivity and accuracy of the audio information. In contrast, using a lower number of the acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on the frame 1010, an orientation associated with each acoustic transducer 1020, or some combination thereof.

The acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to the acoustic transducers 1020 inside the ear canal. Having an acoustic transducer 1020 positioned next to an ear canal of a user may enable the microphone array to collect information on how sounds arrive at the ear canal. By positioning at least two of the acoustic transducers 1020 on either side of a user's head (e.g., as binaural microphones), the augmented-reality system 1000 may simulate binaural hearing and capture a 3D stereo sound field around about a user's head. In some embodiments, the acoustic transducers 1020(A) and 1020(B) may be connected to the augmented-reality system 1000 via a wired connection 1030, and in other embodiments the acoustic transducers 1020(A) and 1020(B) may be connected to the augmented-reality system 1000 via a wireless connection (e.g., a BLUETOOTH connection). In still other embodiments, the acoustic transducers 1020(A) and 1020(B) may not be used at all in conjunction with the augmented-reality system 1000.

The acoustic transducers 1020 on the frame 1010 may be positioned in a variety of different ways, including along the length of the temples, across the bridge, above or below the display devices 1015(A) and 1015(B), or some combination thereof. The acoustic transducers 1020 may also be oriented such that the microphone array is able to detect sounds in a wide range of directions surrounding the user wearing the augmented-reality system 1000. In some embodiments, an optimization process may be performed during manufacturing of the augmented-reality system 1000 to determine relative positioning of each acoustic transducer 1020 in the microphone array.

In some examples, the augmented-reality system 1000 may include or be connected to an external device (e.g., a paired device), such as neckband 1005. The neckband 1005 generally represents any type or form of paired device. Thus, the following discussion of the neckband 1005 may also apply to various other paired devices, such as charging cases, smart watches, smart phones, wristbands, other wearable devices, hand-held controllers, tablet computers, laptop computers, other external compute devices, etc.

As shown, the neckband 1005 may be coupled to the eyewear device 1002 via one or more connectors. The connectors may be wired or wireless and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and neckband 1005 in example locations on the eyewear device 1002 and neckband 1005, the components may be located elsewhere and/or distributed differently on the eyewear device 1002 and/or neckband 1005. In some embodiments, the components of the eyewear device 1002 and neckband 1005 may be located on one or more additional peripheral devices paired with the eyewear device 1002, the neckband 1005, or some combination thereof.

Pairing external devices, such as the neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 since users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a stand-alone eyewear device. Since weight carried in the neckband 1005 may be less invasive to a user than weight carried in the eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1005 may be communicatively coupled with the eyewear device 1002 and/or to other devices. These other devices may provide certain functions (e.g., tracking, localizing, depth mapping, processing, storage, etc.) to the augmented-reality system 1000. In the embodiment of FIG. 10, the neckband 1005 may include two acoustic transducers (e.g., 1020(I) and 1020(J)) that are part of the microphone array (or potentially form their own microphone subarray). The neckband 1005 may also include a controller 1025 and a power source 1035.

The acoustic transducers 1020(I) and 1020(J) of the neckband 1005 may be configured to detect sound and convert the detected sound into an electronic format (analog or digital). In the embodiment of FIG. 10, the acoustic transducers 1020(I) and 1020(J) may be positioned on the neckband 1005, thereby increasing the distance between the neckband acoustic transducers 1020(I) and 1020(J) and other acoustic transducers 1020 positioned on the eyewear device 1002. In some cases, increasing the distance between the acoustic transducers 1020 of the microphone array may improve the accuracy of beamforming performed via the microphone array. For example, if a sound is detected by the acoustic transducers 1020(C) and 1020(D) and the distance between the acoustic transducers 1020(C) and 1020(D) is greater than, e.g., the distance between the acoustic transducers 1020(D) and 1020(E), the determined source location of the detected sound may be more accurate than if the sound had been detected by the acoustic transducers 1020(D) and 1020(E).

The controller 1025 of the neckband 1005 may process information generated by the sensors on the neckband 1005 and/or augmented-reality system 1000. For example, the controller 1025 may process information from the microphone array that describes sounds detected by the microphone array. For each detected sound, the controller 1025 may perform a direction-of-arrival (DOA) estimation to estimate a direction from which the detected sound arrived at the microphone array. As the microphone array detects sounds, the controller 1025 may populate an audio data set with the information. In embodiments in which the augmented-reality system 1000 includes an inertial measurement unit, the controller 1025 may compute all inertial and spatial calculations from the IMU located on the eyewear device 1002. A connector may convey information between the augmented-reality system 1000 and the neckband 1005 and between the augmented-reality system 1000 and the controller 1025. The information may be in the form of optical data, electrical data, wireless data, or any other transmittable data form. Moving the processing of information generated by the augmented-reality system 1000 to the neckband 1005 may reduce weight and heat in the eyewear device 1002, making it more comfortable for the user.

The power source 1035 in the neckband 1005 may provide power to the eyewear device 1002 and/or to the neckband 1005. The power source 1035 may include, without limitation, lithium-ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. The virtual-reality system 1100 may include a front rigid body 1102 and a band 1104 shaped to fit around a user's head. The virtual-reality system 1100 may also include output audio transducers 1106(A) and 1106(B). Furthermore, while not shown in FIG. 11, the front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1000 and/or the virtual-reality system 1100 may include one or more liquid crystal displays (LCDs), light-emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality system 1000 and virtual-reality system 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
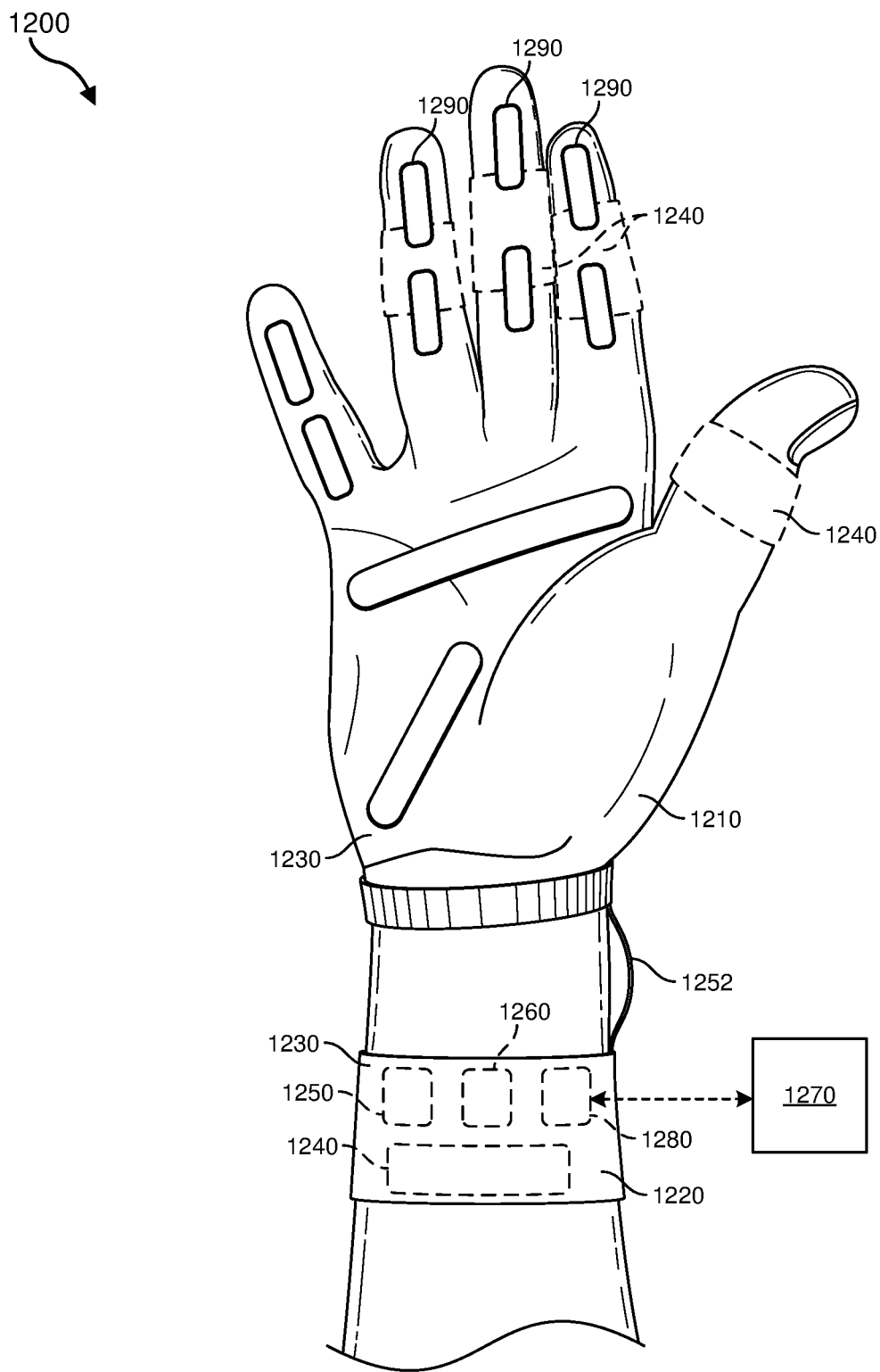
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a haptic system 1200 in the form of a wearable glove (haptic device 1210) and wristband (haptic device 1220). The haptic device 1210 and the haptic device 1220 are shown as examples of wearable devices that include a flexible, wearable textile material 1230 that is shaped and configured for positioning against a user's hand and wrist, respectively. This disclosure also includes haptic systems that may be shaped and configured for positioning against other human body parts, such as a finger, an arm, a head, a torso, a foot, or a leg. By way of example and not limitation, haptic systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more haptic devices 1240 may be positioned at least partially within one or more corresponding pockets formed in the textile material 1230 of the haptic system 1200. The haptic devices 1240 may be positioned in locations to provide a haptic signal (e.g., vibration, force, etc.) to a user of the haptic system 1200. For example, the haptic devices 1240 may be positioned against the user's finger(s), thumb, or wrist, as shown in FIG. 12. The haptic devices 1240 may, in some examples, be sufficiently flexible to conform to or bend with the user's corresponding body part(s).

A power source 1250 (e.g., a battery) for applying a voltage to the haptic devices 1240 for activation thereof may be electrically coupled to the haptic devices 1240, such as via conductive wiring 1252. In some examples, each of the haptic devices 1240 may be independently electrically coupled to the power source 1250 for individual activation. In some embodiments, a processor 1260 may be operatively coupled to the power source 1250 and configured (e.g., programmed) to control activation of the haptic devices 1240.

The haptic system 1200 may be implemented in a variety of ways. In some examples, the haptic system 1200 may be a standalone system with integral subsystems and components for operation independent of other devices and systems. As another example, the haptic system 1200 may be configured for interaction with another device or system 1270. For example, the haptic system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1280 may enable communications between the haptic system 1200 and the other device or system 1270 via a wireless (e.g., Wi-Fi, BLUETOOTH, cellular, radio, etc.) link or a wired link. If present, the communications interface 1280 may be in communication with the processor 1260, such as to provide a signal to the processor 1260 to activate or deactivate one or more of the haptic devices 1240.

The haptic system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, the haptic devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although the power source 1250, processor 1260, and communications interface 1280 are illustrated in FIG. 12 as being positioned in the haptic device 1220, the present disclosure is not so limited. For example, one or more of the power source 1250, processor 1260, or communications interface 1280 may be positioned within the haptic device 1210 or within another wearable textile.

Figure 13:
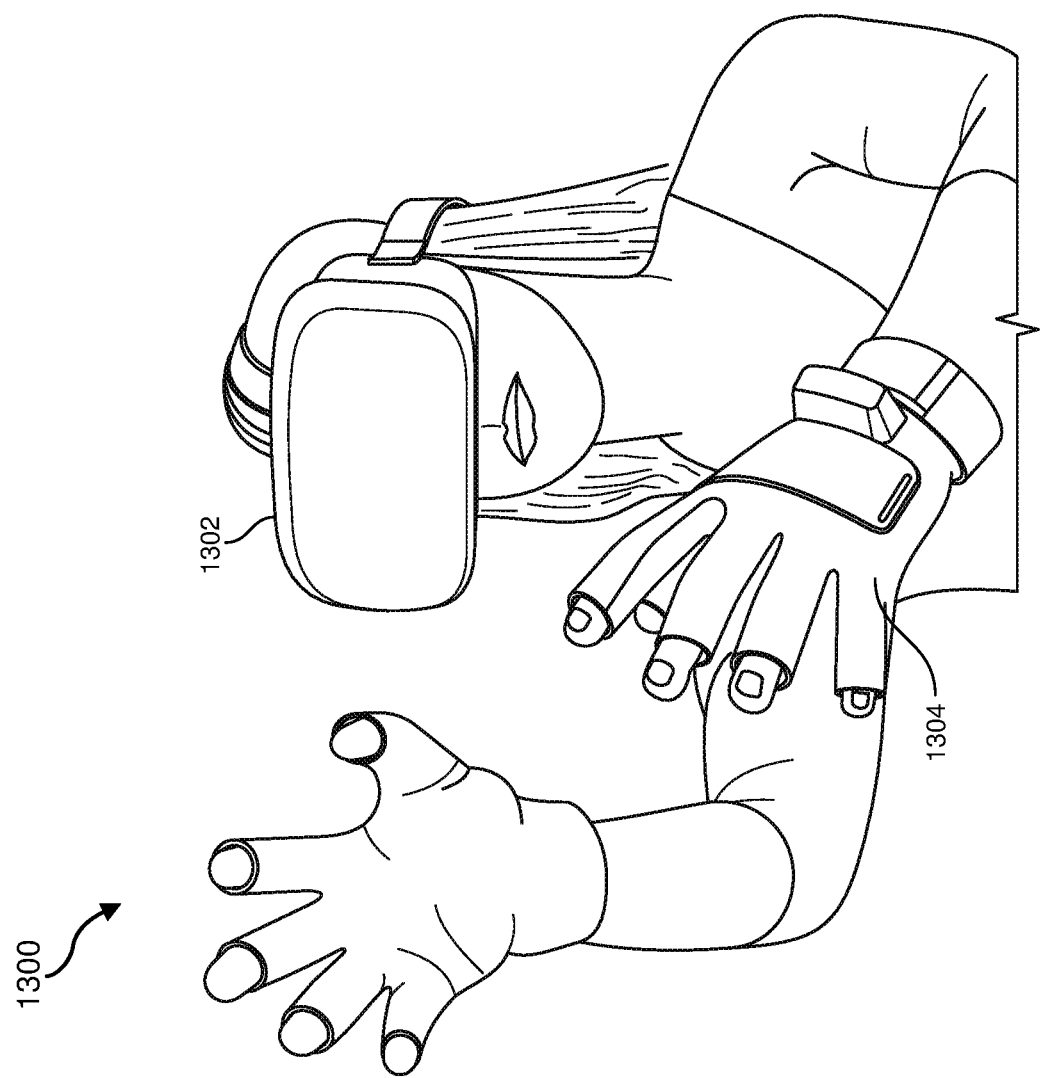
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 11:
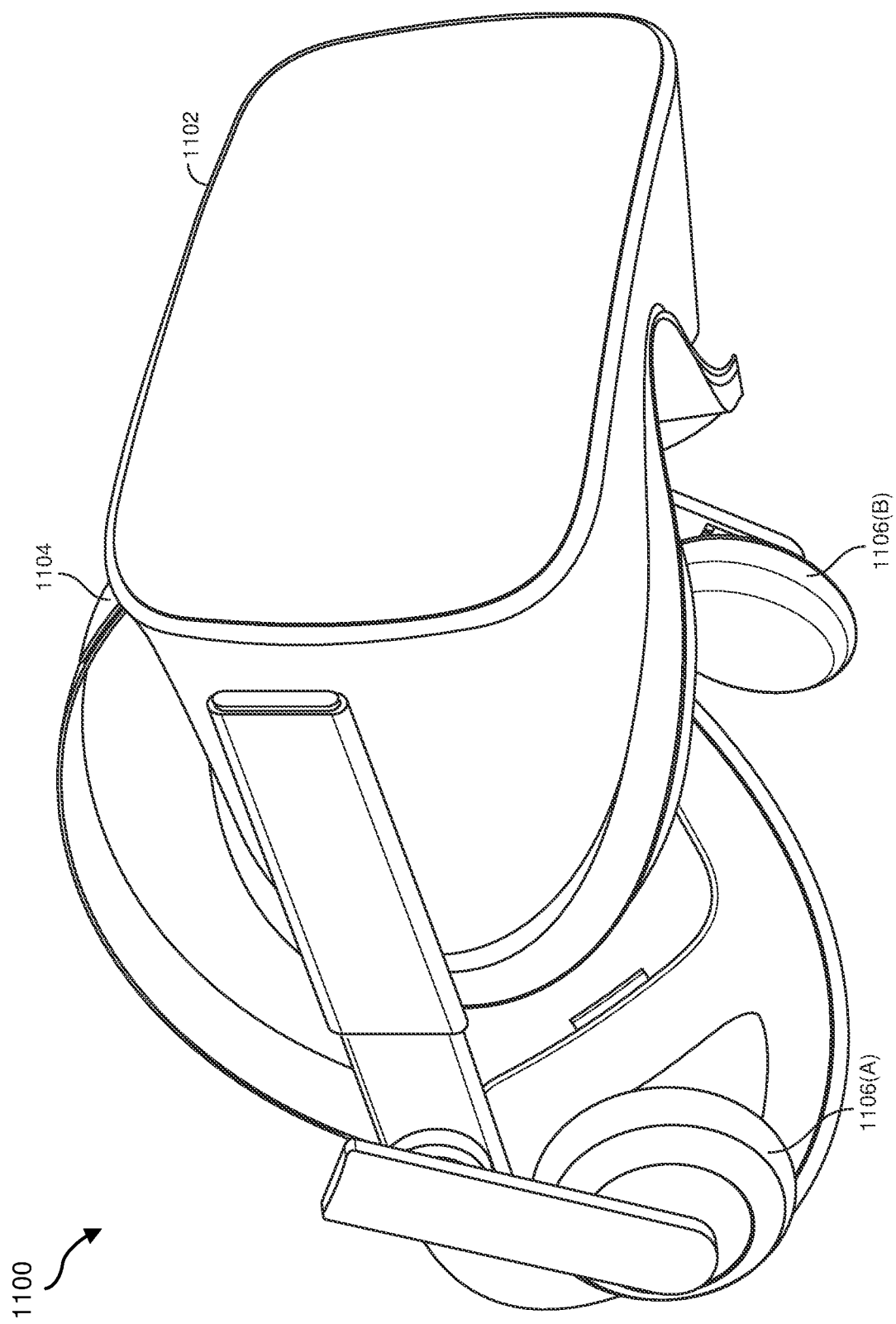
FIG. 11 is an illustration of an exemplary virtual-reality headset that may be used in connection with embodiments of this disclosure.

A head-mounted display 1302 generally represents any type or form of virtual-reality system, such as the virtual-reality system 1100 in FIG. 11. A haptic device 1304 generally represents any type or form of wearable device, worn by a user of an artificial-reality system, that provides haptic feedback to the user to give the user the perception that he or she is physically engaging with a virtual object. In some embodiments, the haptic device 1304 may provide haptic feedback by applying vibration, motion, and/or force to the user. For example, the haptic device 1304 may limit or augment a user's movement. To give a specific example, the haptic device 1304 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use the haptic device 1304 to send action requests to a console. Examples of action requests include, without limitation, requests to start an application and/or end the application and/or requests to perform a particular action within the application.

Figure 14:
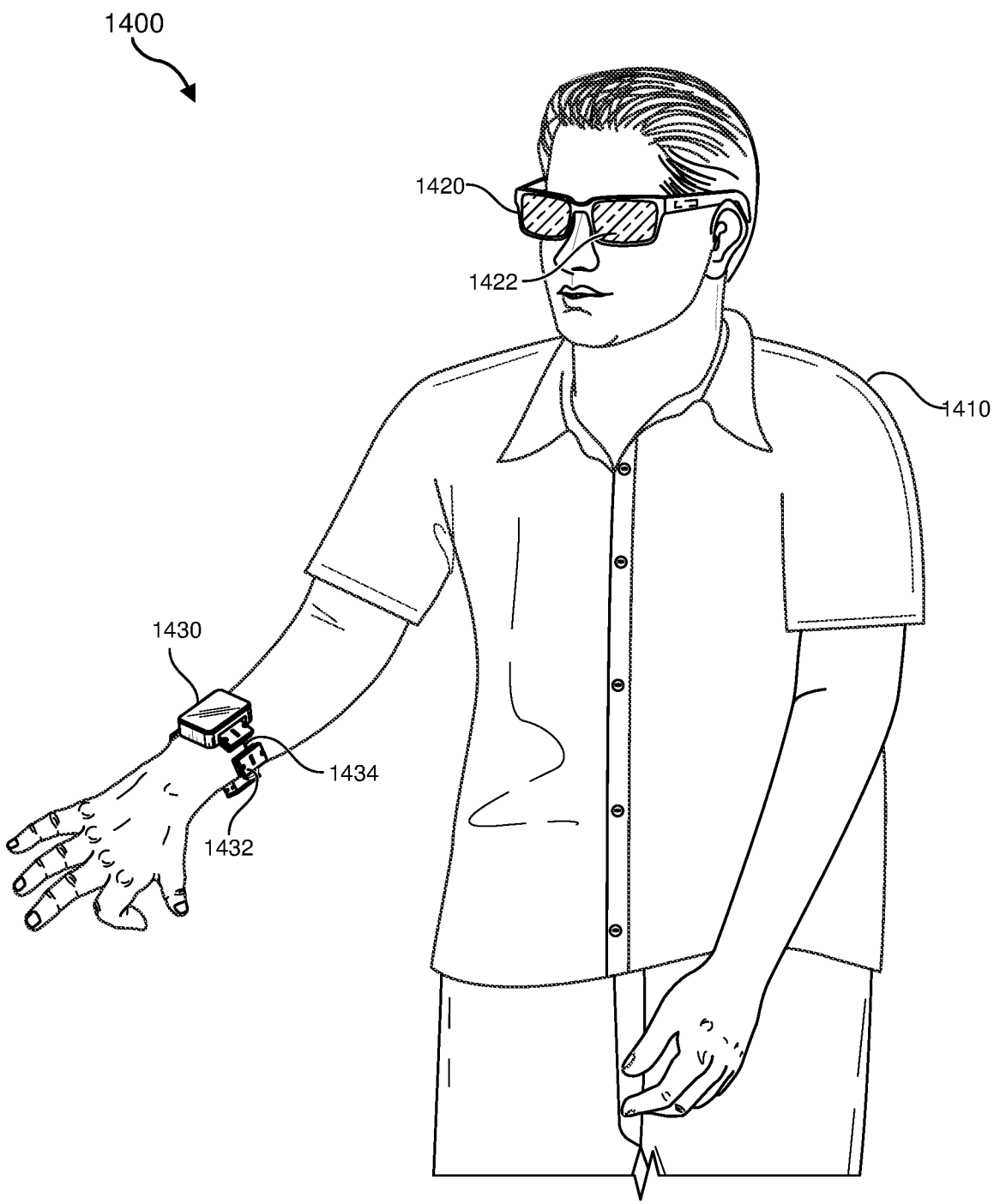
FIG. 14 is an illustration of an exemplary augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view of a user 1410 interacting with an augmented-reality system 1400. In this example, the user 1410 may wear a pair of augmented-reality glasses 1420 that may have one or more displays 1422 and that are paired with a haptic device 1430. In this example, the haptic device 1430 may be a wristband that includes a plurality of band elements 1432 and a tensioning mechanism 1434 that connects the band elements 1432 to one another.

One or more of the band elements 1432 may include any type or form of actuator suitable for providing haptic feedback. For example, one or more of the band elements 1432 may be configured to provide one or more of various types of cutaneous feedback, including vibration, force, traction, texture, and/or temperature. To provide such feedback, the band elements 1432 may include one or more of various types of actuators. In one example, each of the band elements 1432 may include a haptic actuator (e.g., a vibrotactile actuator) configured to vibrate in unison or independently to provide one or more of various types of haptic sensations to a user. Alternatively, only a single band element or a subset of band elements may include vibrotactors.

The haptic devices 1210, 1220, 1304, and 1430 may include any suitable number and/or type of haptic transducer, sensor, and/or feedback mechanism. For example, the haptic devices 1210, 1220, 1304, and 1430 may include one or more mechanical transducers, piezoelectric transducers, and/or fluidic transducers. The haptic devices 1210, 1220, 1304, and 1430 may also include various combinations of different types and forms of transducers that work together or independently to enhance a user's artificial-reality experience. In one example, each of the band elements 1432 of the haptic device 1430 may include a haptic actuator (e.g., a vibrotactile actuator) configured to vibrate in unison or independently to provide one or more of various types of haptic sensations to a user.

The following example embodiments are also included in this disclosure:

Example 1: A haptic actuator, which may include: a first active material coupled to a first side of an inactive substrate; and a second active material coupled to a second side of the inactive substrate; wherein the inactive substrate is formed to initially exhibit a nonplanar shape when the first active material and the second active material are not actuated.

Example 2: The haptic actuator of Example 1, wherein the inactive substrate has a symmetrical shape.

Example 3: The haptic actuator of Example 1, wherein the inactive substrate has a nonsymmetrical shape.

Example 4: The haptic actuator of any of Examples 1 through 3, wherein each of the first active material and the second active material comprises at least one of: a polyvinylidene fluoride; a dielectric elastomer material; a microfiber composite material; a thermally actuated material; or a magnetically actuated material.

Example 5: The haptic actuator of any of Examples 1 through 4, wherein each of the first active material and the second active material comprises at least one electroactive material.

Example 6: A haptic actuator, which may include: a first active material coupled to a first side of an inactive substrate; and a second active material coupled to a second side of the inactive substrate; wherein the inactive substrate comprises at least one discontinuity.

Example 7: The haptic actuator of Example 6, wherein the at least one discontinuity comprises at least one hole.

Example 8: The haptic actuator of Example 6 or 7, wherein the at least one discontinuity comprises at least one slit.

Example 9: A haptic actuator, which may include: a first active material coupled to a first side of an inactive substrate; a second active material coupled to a second side of the inactive substrate; and a pressure source configured to selectively apply a fluid pressure to at least one of the first side or the second side of the inactive substrate.

Example 10: The haptic actuator of Example 9, wherein the pressure source is configured to selectively apply the fluid pressure to only one of the first side or the second side of the inactive substrate.

Example 11: A haptic actuator, which may include: a plurality of distinct first active materials coupled to a first side of an inactive substrate; and at least one second active material coupled to a second side of the inactive substrate; wherein each first active material of the plurality of distinct first active materials is individually actuatable independent from other first active materials of the plurality of distinct first active materials.

Example 12: The haptic actuator of Example 11, wherein the at least one second active material comprises a plurality of distinct second active materials.

Example 13: The haptic actuator of Example 11 or 12, wherein the plurality of distinct first active materials comprises at least two concentric first active materials.

Example 14: The haptic actuator of any of Examples 11 through 13, wherein the plurality of distinct first active materials comprises more than two first active materials.

Example 15: The haptic actuator of any of Examples 11 through 14, wherein the plurality of distinct first active materials comprises at least two distinct first active materials that are laterally adjacent to each other on the first side of the inactive substrate.

Example 16: The haptic actuator of any of Examples 11 through 15, wherein the plurality of distinct first active materials comprises an array of first active materials coupled to the first side of the inactive substrate.

Example 17: A haptic actuator, which may include: a bistable substrate that is movable between a first stable position and a second stable position; a first active material coupled to a first side of the bistable substrate; and a second active material coupled to a second side of the bistable substrate.

Example 18: A haptic actuator, which may include: a first active material coupled to a first side of an inactive substrate; and a second active material coupled to a second side of the inactive substrate; wherein at least one of the first active material or the second active material is formed to initially exhibit a nonplanar shape when not actuated.

Example 19: A wearable device, which may include: a body shaped and sized to be worn on a body part of a user; and at least one haptic actuator of any of Examples 1 through 18.

Example 20: The wearable device of Example 19, wherein the body comprises at least one of: a glove; a wristwatch; a wristband; an armband; a vest; or a headband.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A haptic actuator, comprising:
    a first active material coupled to a first side of an inactive substrate; and
    a second active material coupled to a second side of the inactive substrate,
    wherein the inactive substrate is formed to initially exhibit a nonplanar shape when the first active material and the second active material are not actuated.

2. The haptic actuator of claim 1, wherein the inactive substrate has a symmetrical shape.

3. The haptic actuator of claim 1, wherein the inactive substrate has a nonsymmetrical shape.

4. The haptic actuator of claim 1, wherein each of the first active material and the second active material comprises at least one of:
    a polyvinylidene fluoride;
    a dielectric elastomer material;
    a microfiber composite material;
    a thermally actuated material; or
    a magnetically actuated material.

5. The haptic actuator of claim 1, wherein each of the first active material and the second active material comprises at least one electroactive material.

6. The haptic actuator of claim 1, wherein the inactive substrate comprises at least one discontinuity.

7. The haptic actuator of claim 6, wherein the at least one discontinuity comprises at least one hole.

8. The haptic actuator of claim 6, wherein the at least one discontinuity comprises at least one slit.

9. The haptic actuator of claim 1, further comprising a pressure source configured to selectively apply a fluid pressure to at least one of the first side or the second side of the inactive substrate.

10. The haptic actuator of claim 9, wherein the pressure source is configured to selectively apply the fluid pressure to only one of the first side or the second side of the inactive substrate.

11. A haptic actuator, comprising:
a plurality of distinct first active materials coupled to a first side of an inactive substrate; and
at least one second active material coupled to a second side of the inactive substrate,
wherein each first active material of the plurality of distinct first active materials is individually actuatable independent from other first active materials of the plurality of distinct first active materials.

12. The haptic actuator of claim 11, wherein the at least one second active material comprises a plurality of distinct second active materials.

13. The haptic actuator of claim 11, wherein the plurality of distinct first active materials comprises at least two concentric first active materials.

14. The haptic actuator of claim 11, wherein the plurality of distinct first active materials comprises more than two first active materials.

15. The haptic actuator of claim 11, wherein the plurality of distinct first active materials comprises at least two distinct first active materials that are laterally adjacent to each other on the first side of the inactive substrate.

16. The haptic actuator of claim 11, wherein the plurality of distinct first active materials comprises an array of first active materials coupled to the first side of the inactive substrate.

17. The haptic actuator of claim 11, wherein the inactive substrate initially exhibits a nonplanar shape when the plurality of distinct first active materials and the at least one second active material are not actuated.

18. The haptic actuator of claim 11, comprising wherein each first active material of the plurality of distinct first active materials initially exhibits a nonplanar shape when not actuated.

19. A wearable device, comprising:
a body shaped and sized to be worn on a body part of a user;
a haptic actuator coupled to the body, the haptic actuator comprising:
an inactive substrate having a nonplanar shape when the haptic actuator is not actuated;
at least one first active material coupled to a first side of the inactive substrate; and
at least one second active material coupled to a second, opposite side of the inactive substrate.

20. The wearable device of claim 19, wherein the body comprises at least one of:
a glove;
a wristwatch;
a wristband;
an armband;
a vest; or
a headband.

* * * * *